US007647075B2

(12) United States Patent
Tsuda et al.

(10) Patent No.: US 7,647,075 B2
(45) Date of Patent: Jan. 12, 2010

(54) TERMINAL DEVICE AND PROGRAM

(75) Inventors: Masayuki Tsuda, Tokyo (JP); Mao Asai, Yokosuka (JP); Nobuyuki Watanabe, Sayama (JP); Tatsuro Oi, Kawasaki (JP); Yasunori Hattori, Fujisawa (JP); Masakazu Nishida, Yokosuka (JP); Naoki Naruse, Yokohama (JP); Yuichi Ichikawa, Yokosuka (JP); Atsuki Tomioka, Yokohama (JP); Masato Takeshita, Mitaka (JP); Kazuhiro Yamada, Yokohama (JP); Satoshi Washio, Tokyo (JP); Dai Kamiya, Tokyo (JP); Naoki Yamane, Tokyo (JP); Keiichi Murakami, Ichikawa (JP)

(73) Assignee: NTT DoCoMo, Inc., Tokyo (JP)

( * ) Notice: Subject to any disclaimer, the term of this patent is extended or adjusted under 35 U.S.C. 154(b) by 116 days.

(21) Appl. No.: 10/810,499

(22) Filed: Mar. 26, 2004

(65) Prior Publication Data
US 2005/0003850 A1 Jan. 6, 2005

(30) Foreign Application Priority Data
Mar. 28, 2003 (JP) ............................. 2003-091296

(51) Int. Cl.
*H04M 1/00* (2006.01)
*G06F 9/48* (2006.01)
*G06F 3/048* (2006.01)
(52) U.S. Cl. ................... 455/566; 455/567; 718/108; 715/809; 715/864
(58) Field of Classification Search ......... 455/418–420, 455/566, 556.2; 715/772, 779, 808–809, 715/864; 717/129; 719/312–320; 718/108
See application file for complete search history.

(56) References Cited

U.S. PATENT DOCUMENTS

| 5,632,032 | A | * | 5/1997 | Ault et al. .................... 718/100 |
| 5,634,196 | A | * | 5/1997 | Alford ......................... 455/18 |
| 6,188,886 | B1 | | 2/2001 | Macaulay et al. ........... 455/415 |
| 6,385,662 | B1 | * | 5/2002 | Moon et al. ................. 719/318 |
| 6,459,440 | B1 | * | 10/2002 | Monnes et al. .............. 715/808 |
| 6,608,637 | B1 | * | 8/2003 | Beaton et al. ............... 715/762 |
| 6,658,247 | B1 | * | 12/2003 | Saito ....................... 455/412.1 |
| 6,941,410 | B1 | * | 9/2005 | Traversat et al. ............... 711/6 |
| 7,016,706 | B2 | * | 3/2006 | Kurokawa et al. .......... 455/566 |

(Continued)

FOREIGN PATENT DOCUMENTS

CN 1266326 A 9/2000

(Continued)

OTHER PUBLICATIONS

Japanese Office Action dated Jan. 15, 2008.

(Continued)

*Primary Examiner*—Lester Kincaid
*Assistant Examiner*—Matthew Sams
(74) *Attorney, Agent, or Firm*—Brinks Hofer Gilson & Lione

(57) ABSTRACT

In a terminal device equipped with a function of running an application program, operation of an application program is suspended when an event is detected, the type of the event is predetermined, and event data representing the detected event is stored. Then, the terminal device delivers stored event data to the application program, after the suspended application is resumed.

35 Claims, 7 Drawing Sheets

U.S. PATENT DOCUMENTS

| | | | |
|---|---|---|---|
| 7,190,977 B2 * | 3/2007 | Hikishima | 455/566 |
| 2003/0045245 A1 * | 3/2003 | Hikishima | 455/90 |
| 2003/0100347 A1 | 5/2003 | Okada et al. | 455/567 |
| 2003/0119562 A1 * | 6/2003 | Kokubo | 455/566 |

FOREIGN PATENT DOCUMENTS

| | | |
|---|---|---|
| EP | 1271902 A1 | 1/2003 |
| GB | 2378535 A | 2/2003 |
| JP | 9-319595 | 12/1997 |
| JP | 2001-519558 | 10/2001 |
| JP | 2002-77329 | 3/2002 |
| JP | 2002-77458 A | 3/2002 |

OTHER PUBLICATIONS

European Search Report dated May 28, 2008.
European Office Action dated Jul. 29, 2008.

* cited by examiner

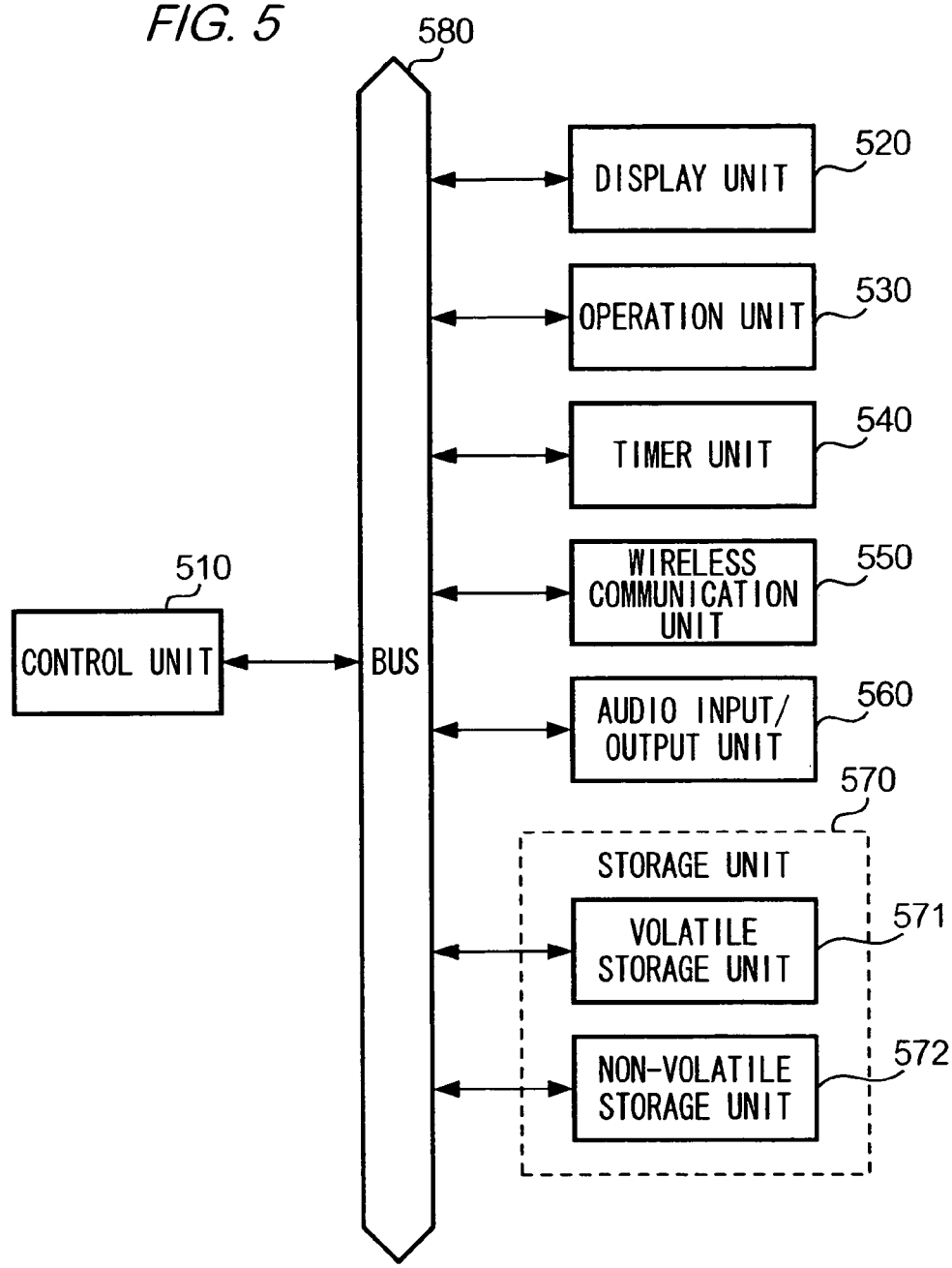

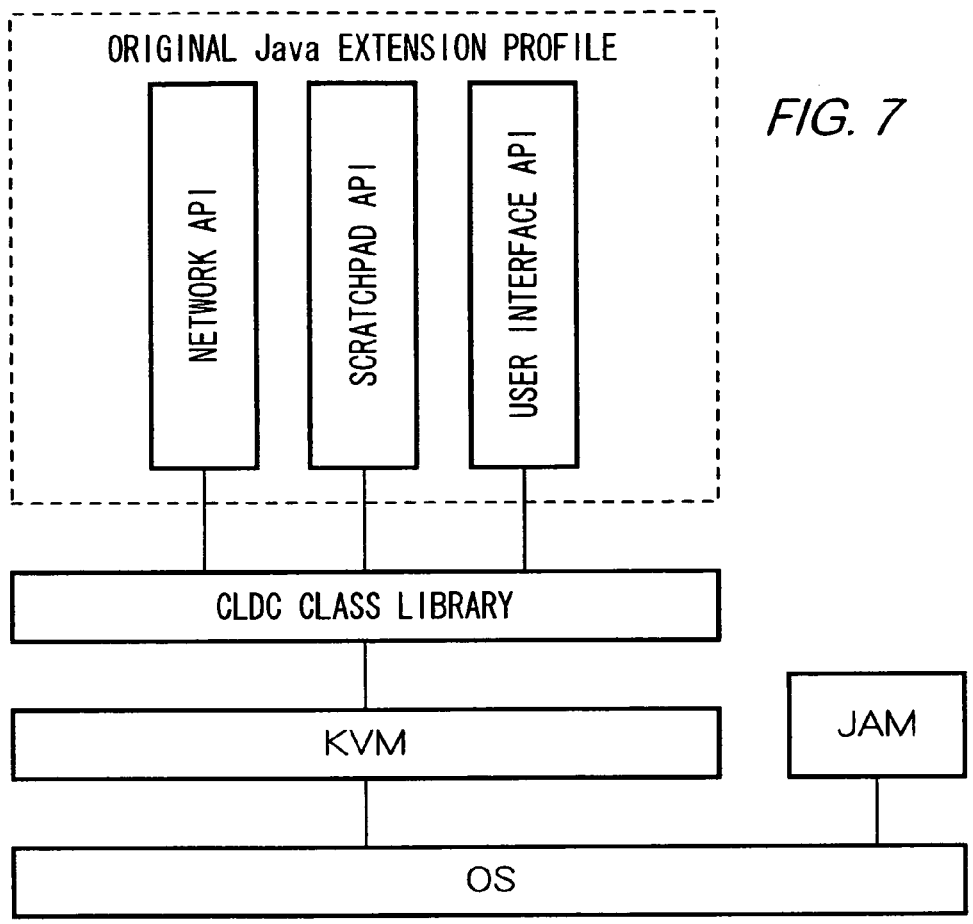
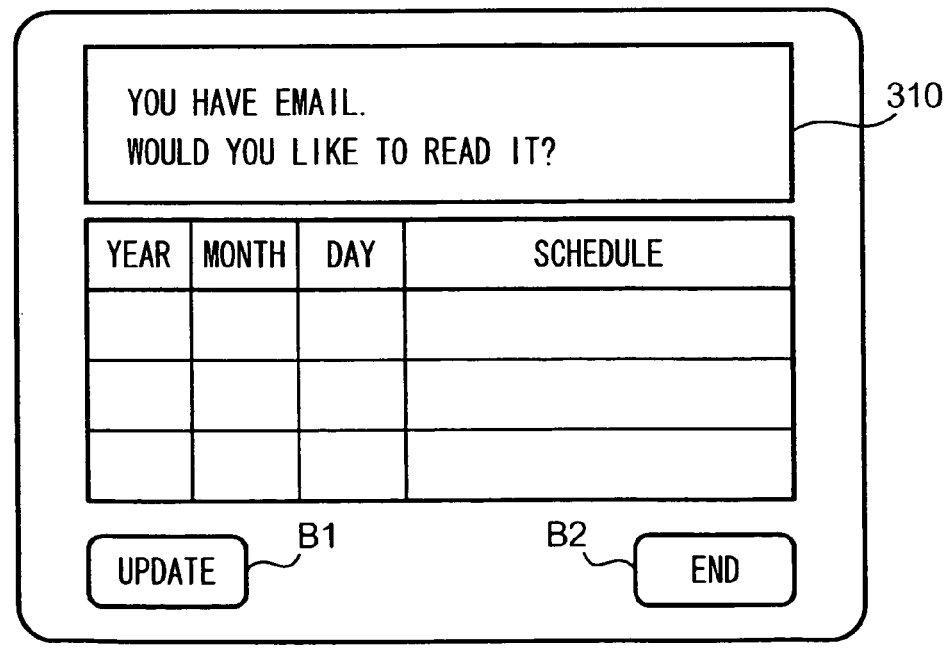

TERMINAL DEVICE AND PROGRAM

This application claims priority under 35 U.S.C. §119 to Japanese Patent Application No. 2003-091296 filed Mar. 28, 2003, the entire content of which is hereby incorporated by reference.

TECHNICAL FIELD

The present invention relates to improving design flexibility of an application program.

RELATED ART

Mobile phones capable of running application programs such as game programs or scheduling programs (hereafter referred to as schedulers) are widespread. In a mobile phone of this type, operation of an application program is suspended on receipt of a call and resumed after the call. For example, Japanese Patent publication JP-A-2002-77458 illustrates such a technique for suspension/resumption of an application program; and discloses that operation of an application program is suspended to enable a call when a call request is received during operation of the application program, and the application program is resumed after the call is terminated.

However, an option to reject such a function as that described above may be desirable. For example, a user carrying a personal device such as a mobile phone may, depending on the user's situation, desire that an application program not be resumed when a call is terminated. In the above described technique, however, the same screen image is always displayed on the mobile phone when the application program is resumed, as the screen image displayed at the time that operation of the application program is suspended. That is, the image displayed at the time of resumption is same as the image displayed at the time of suspension, and a change in the user's situation while operation of the application program is suspended is not taken into account.

SUMMARY OF THE INVENTION

The present invention was conceived in view of the above described situation; and provides a terminal device having a function of running an application which has a function of changing operation of the application program in accordance with the type of the event between the period from the time of suspending operation of the application program to the time of resuming the operation of the application program.

The present invention provides a terminal device comprising: detection means for detecting a predetermined event and generating event data representing the event, suspension means for suspending operation of an application program when an event is detected by the detection means; storage means for storing the event data generated by the detection means; resume means for resuming operation of the application program suspended by the suspension means; and delivering means for delivering the event data stored by the storage means to the application program resumed.

Also, the present invention provides a program product for causing a computer device to execute the processes of: detecting an event and generating event data representing the event, and the type of the event is predetermined; suspending operation of an application program when an event is detected in the detecting process; storing the event data generated in the detecting process; resuming operation of the application program suspended in the suspending process; and delivering the event data stored in the storing process to the resumed application program.

In the terminal device or in the operation of the program according to the present invention, event data representing an event is stored when operation of an application is suspended by the event; and the event data is delivered to the resumed application after operation of the suspended application is resumed.

Accordingly, the present invention provides a terminal device having a function of running an application which has a function of changing operation of the application program in accordance with the type of the event between the period from the time of suspending operation of the application program to the time of resuming the operation of the application program. Thus, design flexibility and development flexibility are improved accordingly.

BRIEF DESCRIPTION OF THE DRAWINGS

FIG. 5 is a block diagram illustrating a structure of the terminal device 10.

FIG. 6 is a drawing illustrating contents of an interrupt event table stored in the non-volatile storage unit 572 of the terminal device 10.

FIG. 7 is a block diagram illustrating a Java Runtime Environment in the terminal device 10.

FIG. 11 is a drawing illustrating a schedule registration screen displayed on the display unit 520 of the terminal device 10.

DETAILED DESCRIPTION OF THE PREFERRED EMBODIMENTS

Embodiments of the present invention will now be described with reference to the drawings.

A. Structure

A-1: Structure of Communication System

Figure 1:
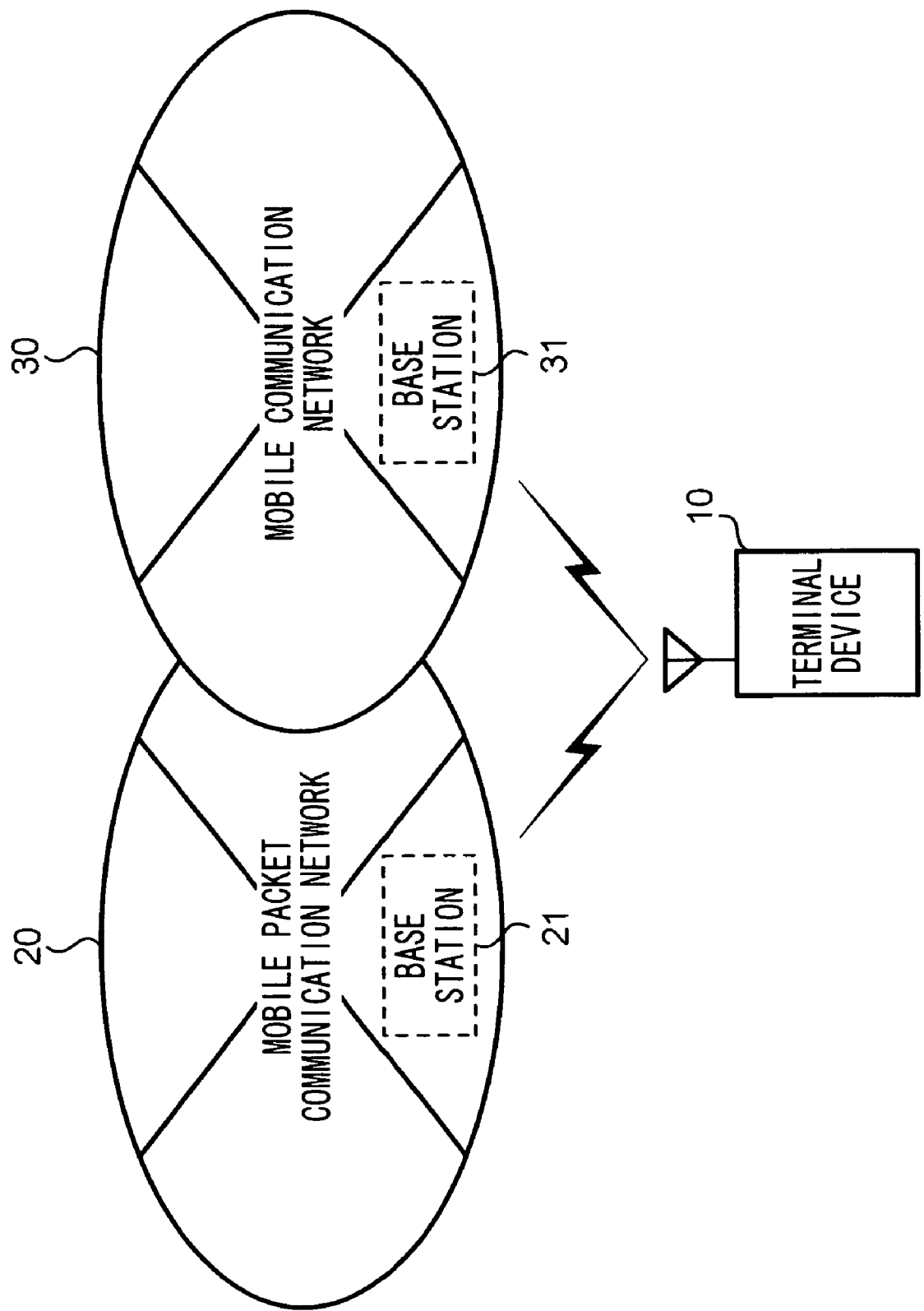
FIG. 1 is a drawing illustrating a structure of a communication system used with the terminal device 10 of the present invention.

FIG. 1 is a drawing illustrating a structural example of a communication system including a terminal device of the present invention. As shown in FIG. 1, the communication system has a terminal device 10, a mobile packet communication network 20, and a mobile telephone network 30. Although only one terminal device 10 is illustrated in FIG. 1, a plurality of terminal devices 10 is included in the actual communication system.

The mobile packet communication network 20 contains a plurality of base stations 21; and is able to provide a packet communication service to terminal devices 10 located within wireless areas (hereafter referred to as wireless cells) covered by the base stations 21. The mobile telephone network 30 contains a plurality of base stations 31; and is able to provide a mobile telephone service to terminal devices 10 located within wireless areas covered by the base stations 31.

Terminal device 10 is configured as a mobile phone provided with a Java Runtime Environment and Java-APP. The Java Runtime Environment is used to run a program written in an object oriented programming language, Java (Registered Trademark). Java-APP is an application program written in Java; is constituted by the Java bytecodes; and is executable by using the Java Runtime Environment.

Terminal device 10 stores Java-APP in RAM (Random Access Memory) in the form of the Java bytecodes, in response to the instruction of a user; and executes the Java-APP codes by interpreting the Java bytecodes using the Java Runtime Environment.

In the present embodiment, Java-APP is an application program for accomplishing a scheduler function in terminal device 10. The Java-APP causes the terminal device 10 to function in accordance with the flowchart shown in FIG. 2. First, the terminal device 10 displays on a display unit of the terminal device 10 a schedule registration screen shown in FIG. 3, while the Java-APP is running. Thus, a user can interactively input and store his/her schedule data in the terminal device 10 by manipulating an operation unit of the terminal device 10, while watching the screen.

In the present embodiment, Java-APP stored in terminal device 10 will be described as an application program for accomplishing a scheduler function. However, Java-APP may be a game application program, or a special type of application program which causes the terminal device 10 to stand by for a call request while performing another function.

Terminal device 10 carries out wireless communication with a base station 21 covering the wireless cell where the terminal device 10 locates; and can receive email via the mobile packet communication network 20. Also, terminal device 10 carries out a wireless communication with a base station 31 covering the wireless cell where the terminal device 10 is located; and thereby a user carrying the terminal device 10 can carry out voice communication via the mobile telephone network 30.

Terminal device 10 suspends operation of Java-APP, when terminal device 10 receives a call request for the terminal device 10 via the mobile telephone network 30, or receives email via the mobile packet communication network 20. In the present embodiment, terminal device 10 suspends operation of Java-APP such that the terminal device 10 suspends interpretation and execution of the Java bytecodes constituting the Java-APP while keeping the Java bytecodes constituting the Java-APP and data stored by the user during operation of the Java-APP unchanged in RAM. Namely, although interpretation and execution of the Java bytecodes constituting the Java-APP are suspended, data input by the user before suspending operation of the Java-APP remains in RAM, even if operation of Java-APP is suspended.

Figure 2:
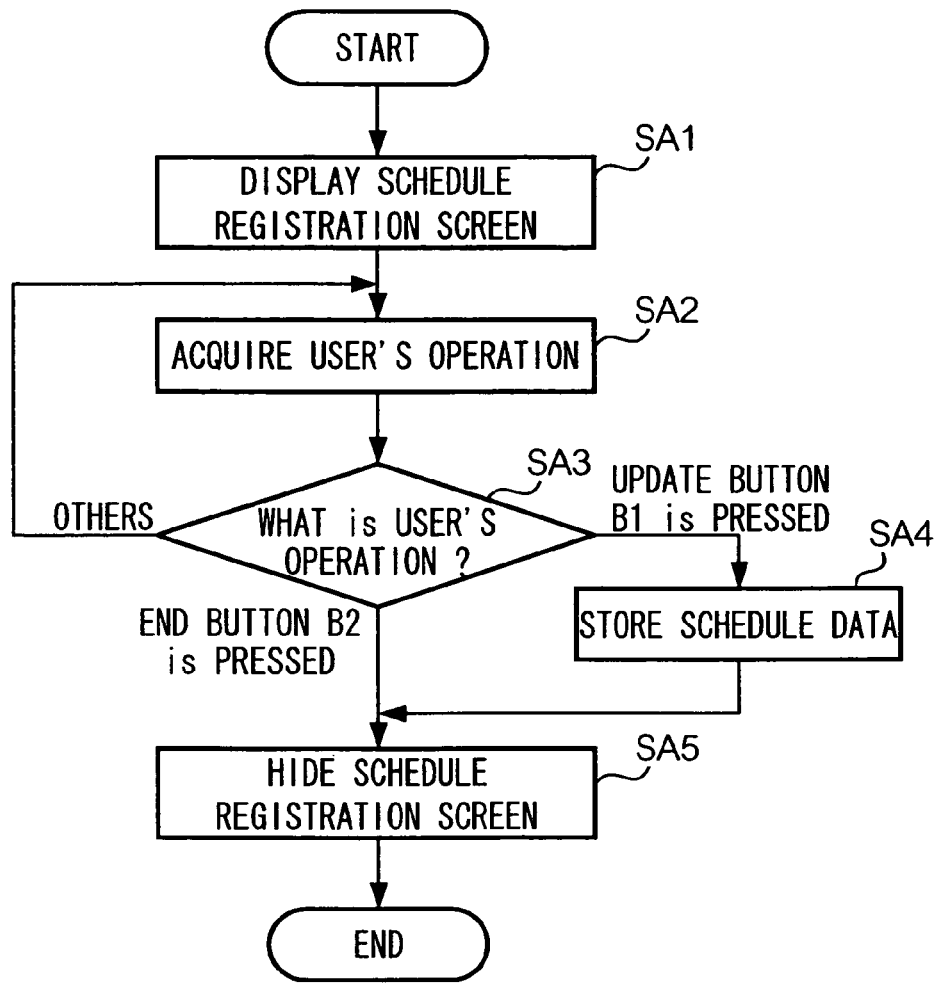
FIG. 2 is a flowchart illustrating flow of operations in the terminal device 10 while Java-APP is running in the terminal device 10.
Figure 4:
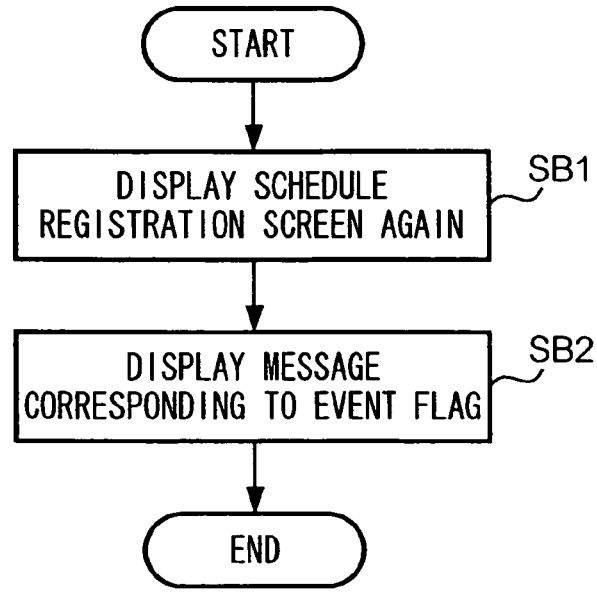
FIG. 4 is a flowchart illustrating flow of operations in the terminal device 10 when a resume method contained in the Java-APP is called.

Then, terminal device 10 resumes operation of the Java-APP after a call is terminated or a specified period of time lapses from receipt of email. In the present embodiment, terminal device 10 resumes operation of Java-APP such that the terminal device 10 resumes interpretation and execution of the Java bytecodes from the suspended point. More specifically, the Java-APP contains a Java method, "resume method", that is called only to resume the Java-APP. Thus, the operation of the Java-APP is resumed after calling the resume method. When the resume method is called, the terminal device 10 carries out the operations shown in FIG. 4; and then resumes interpretation and execution of the Java bytecodes from the point where it was suspended. Thus, the operation shown in FIG. 2 is resumed.

A-2: Structure of the Terminal Device 10

Next, the hardware structure of terminal device 10 will be described with reference to FIG. 5. As shown in FIG. 5, terminal device 10 comprises a control unit 510, a display unit 520, an operation unit 530, a timer unit 540, a wireless communication unit 550, an audio input/output unit 560, a storage unit 570 and a bus 580 for data transfer between each of these components.

The control unit 510 is configured as a CPU (Central Processing Unit), for example; and centrally controls each of these components of terminal device 10 by executing software stored in the storage unit 570. The display unit 520 is configured as a liquid crystal display and a drive circuit for the liquid crystal display, for example; and displays images in accordance with data delivered from the control unit 510. The operation unit 530 is provided with a plurality of operating elements to allow a user of the terminal device to input digits, characters, operating instructions, etc.; and delivers to the control unit 510 data corresponding to the operation of these operating elements. The timer unit 540 performs a timer function, and provides data representing the current time to the control unit 510.

The wireless communication unit 550 is provided with an antenna. The wireless communication unit 550 carries out wireless communication with base station 21; receives packets transmitted from the base station 21 and delivers the received packets to the control unit 510; and transmits packets delivered from the control unit 510 to the base station 21. The wireless communication unit 550 carries out wireless communication with base station 31; receives audio signals from the base station 31 and delivers the received audio signals to the audio input/output unit 560; and transmits audio signals received from the audio input/output unit 560 to the base station 31. The audio input/output unit 560 is provided with a speaker and a microphone, and an audio CODEC (Coder-Decoder) unit (not shown in FIG. 5) for encoding and decoding audio signals. The audio input/output unit 560 drives the speaker to output audio corresponding to audio signals delivered from the wireless communication unit 550; and delivers to the wireless communication unit 550 audio signals corresponding to audio collected by the microphone.

The storage unit 570 has a volatile storage unit 571 and a non-volatile storage unit 572. The volatile storage unit 571 is configured as RAM, for example; and provides the control unit 510 with a work area for executing software. The non-volatile storage unit 572 is configured as EEPROM (Electrically Erasable Programmable Read Only Memory), for example. The non-volatile storage unit 572 stores the Java-APP in the form of a JAR (Java ARchive) file containing the Java-APP. A JAR file contains a Java-APP constituted by Java bytecodes and "resource" used with the Java-APP during operation of the Java-APP, in the form of a single file. The "resource" may include image files containing image data and audio files containing audio data. The non-volatile storage unit 572 also stores an interrupt event table shown in FIG. 6, OS software (Operating System software) for providing functions of an operating system (OS), mail software for receiving and/or transmitting email, and a Java Runtime Environment.

Next, the interrupt event table will be described with reference to FIG. 6. As shown in FIG. 6, the interrupt event table stores a pair of event flags identifying the cause of suspending operation of Java-APP, and a program identifier for identifying the suspended Java-APP. Hereafter the pair is called "interrupt event data". Uses of the interrupt event data in operation will be described in detail later.

In the present embodiment, the event flag has a value of either "1" or "2"; the event flag "1" represents that operation of Java-APP was suspended when a call request was received; and the value "2" represents that operation of Java-APP was suspended when email was received. The program identifier is, for example, a program name of the suspended Java-APP.

The interrupt event table is updated such that an entry is added to the interrupt event table when operation of Java-APP is suspended, and the entry in the interrupt event table is deleted after operation of the Java-APP is resumed. Accordingly, the control unit 510 can determine the cause of suspending operation of Java-APP on the basis of the interrupt event table.

In the case that the terminal device 10 is operating under a single task OS which cannot run a plurality of Java-APPs simultaneously, the suspended Java-APP can be uniquely identified. Therefore, the event table needs to store only the event flag.

Figure 9:
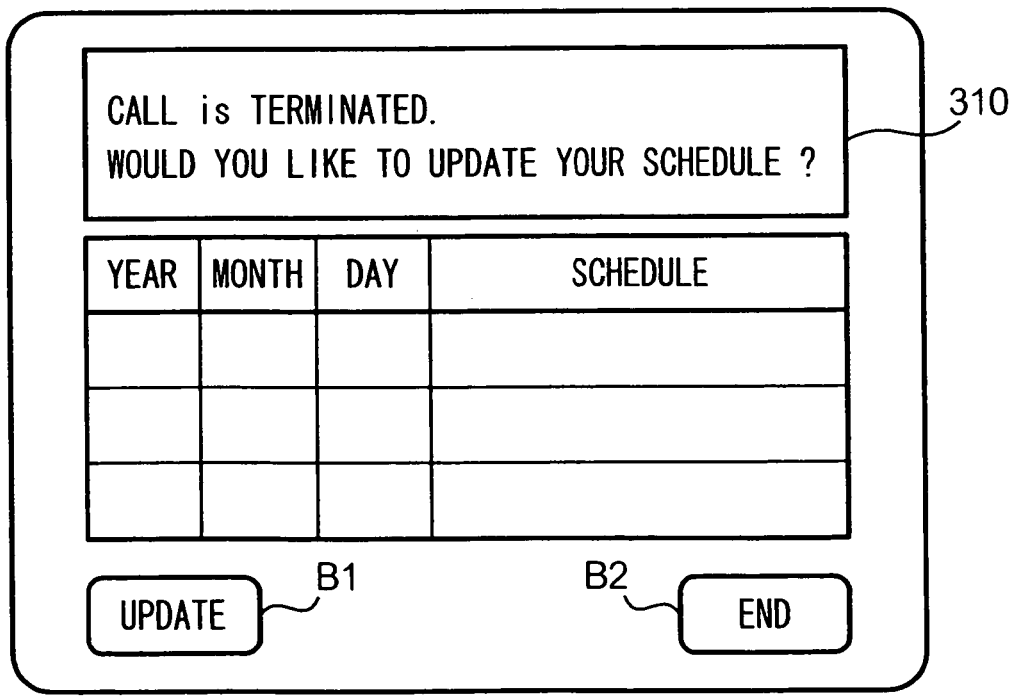
FIG. 9 is a drawing illustrating a schedule registration screen displayed on the display unit 520 of the terminal device 10.

Next, software constituting a Java Runtime Environment in the terminal device 10 will be described with reference to FIG. 7. FIG. 7 is a block diagram illustrating a Java Runtime Environment in the terminal device 10. As shown in FIG. 9, software preinstalled in the terminal device 10 constitutes a Java Runtime Environment conforming to J2ME (Java 2 platform Micro Edition). J2ME is a standard edition of Java Runtime Environment dedicated to small electronic devices. The software preinstalled in the terminal device 10 includes JAM (Java Application Manager), KVM (K Virtual Machine), CLDC class libraries (Connected Limited Device Configuration class libraries), and "original Java extension profiles" for mobile phones.

KVM is an implementation of Java Virtual Machine; and is designed for use in small electronic devices such as mobile phones and PDAs (Personal Digital Assistants). KVM executes Java-APP by converting Java bytecodes constituting the Java-APP to machine codes, which are thereby executed by the control unit 510. CLDC class library is a Java class library for providing general purpose function sets dedicated to small electronic devices such as mobile phones and PDAs.

The original Java extension profiles are class libraries for providing an extended function sets specialized for mobile phones, which are not covered in CLDC class library. The original Java extension profiles include, for example, a user interface API (Application Program Interface), a network API, and a scratchpad API, etc. The user interface API supports a function of providing a user interface in the terminal device 10. The network API supports a function of accessing a network resource specified with a URL (Uniform Resource Locator). The scratchpad API supports functions of reading to and writing from a scratchpad. The scratchpad (not shown in FIG. 5) is a storage region reserved in the non-volatile storage region 572; and stores data generated in operation of the Java-APP, for example, a schedule data input by a user. The control unit 510 performs such functions provided in the APIs by calling the APIs while executing Java bytecodes constituting the Java-APP.

Further, the software preinstalled in the terminal device 10 includes a vendor specific extension library. The vendor specific extension library is a class library for providing vendor specific functions provided by the vendor of the mobile terminal 10.

JAM is software for carrying out management of Java-APPs stored in the terminal device 10, under the control of the OS software. Specifically, the control unit 510 calls JAM to perform management functions of installing, updating, and deleting Java-APPs, displaying a list of names of Java-APPs stored in the non-volatile storage unit 572, and managing operations of Java-APPs. The managements of operations of Java-APPs include launching Java-APPs, unconditionally terminating, suspending, and resuming operation of Java-APPs.

More specifically, in response to an instruction by a user of launching Java-APP, the terminal device 10 calls JAM to store the Java-APP in the volatile storage unit 571, and executes the Java bytecodes constituting the Java-APP by using KVM. Then, the control unit 510 starts detecting an event causing suspension of operating the Java-APP, until an instruction by the user of terminating operation of the Java-APP. When the control unit 510 detects the event causing suspension of operating the Java-APP, the control unit 510 suspends operation of the Java-APP, and stores in the interrupt event table an interrupt event data including a pair of an event flag identifying the cause of the event and a program identifier for identifying the suspended Java-APP. Then, the control unit 510 starts detecting an event causing resumption of operating the Java-APP. When the control unit 510 detects the event causing resumption of operating the Java-APP, the control unit 510 calls the resume method contained in the Java-APP to resume the operation of the Java-APP, and delete the entry of the interrupt event data containing the program identifier of the Java-APP in the interrupt event table.

B. Operation

Features of operations of terminal device 10 will be described with reference to the drawings. In the following examples, the control unit 510 of the terminal device 10 is assumed to operate the above described Java-APP, and start its operation from the event of displaying the schedule registration screen shown in FIG. 3 on the display unit 520 of the terminal device 10.

B-1: Example 1 When a Call Request is Received

Figure 8:
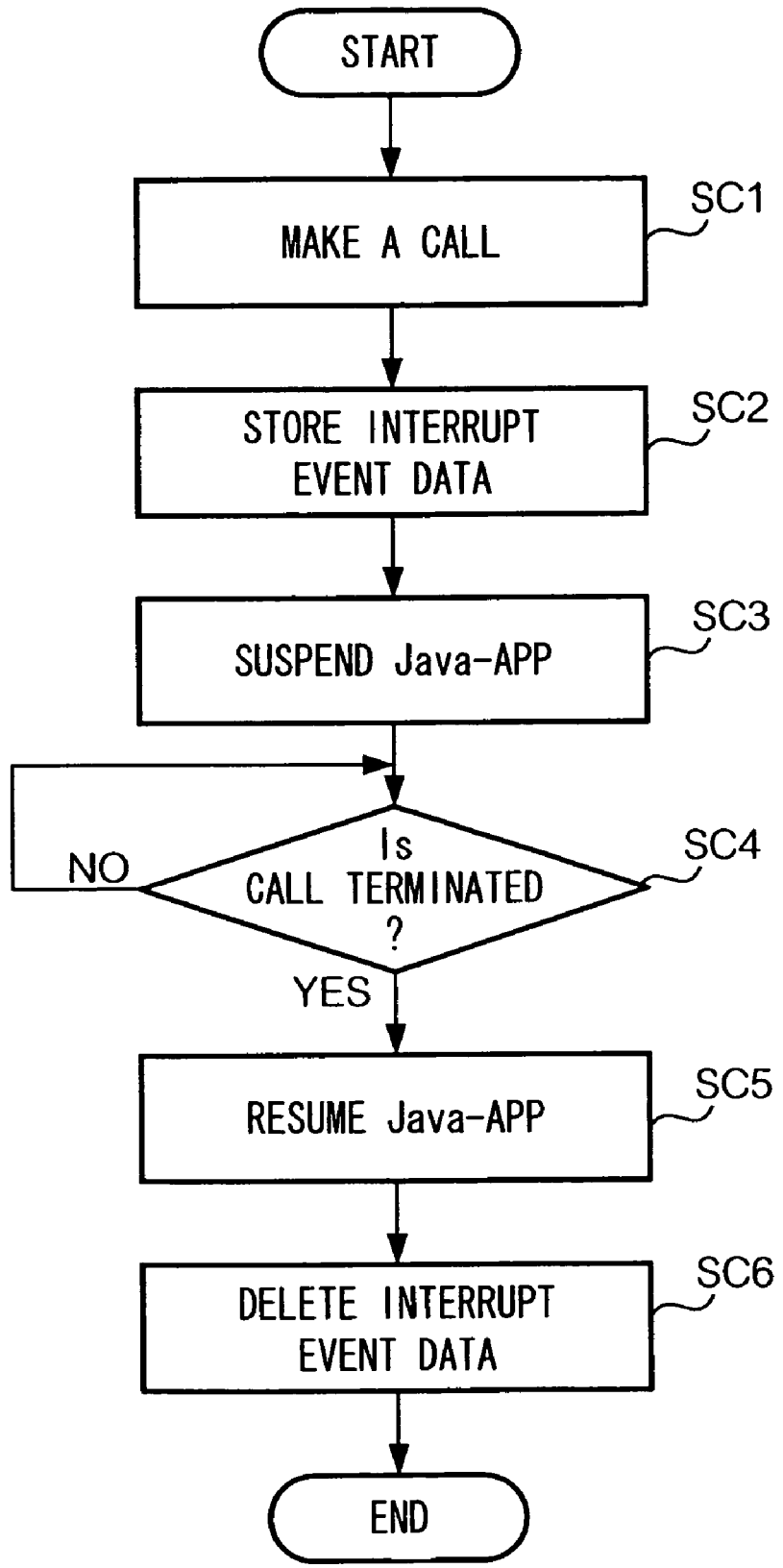
FIG. 8 is a flowchart illustrating flow of operations in the terminal device 10 in the case of receipt of a call request.

Operation of terminal device 10 will be described in the case of receiving a call request, with reference to the flowchart shown in FIG. 8. As shown in FIG. 8, the control unit 510 receives a call request from a node in the wireless communication unit 550 (step SC1). Then, the control unit 510 stores, in the interrupt event table, an entry of the interrupt event data containing a pair of a program identifier of the Java-APP in operation and an event flag "1" representing that suspension was caused by a call request, as shown in FIG. 6 (step SC2). The control unit 510 calls JAM to suspend operation of the Java-APP (step SC3). In the present embodiment, operation of the Java-APP is suspended after storing the interrupt event data in the interrupt event table. However, the interrupt event data may be stored in the interrupt data table after suspending operation of the Java-APP.

Subsequently, the control unit 510 monitors whether the call causing suspension of operating the Java-APP is terminated (step SC4). Specifically, the control unit 510 determines that the call is terminated when the control unit 510 receives from the operation unit 530 an instruction by the user of terminating the call. The control unit 510 repeats the determination step SC4, while the call is not terminated in step SC4. If the call is terminated, the control unit 510 proceeds to step SC5.

Figure 3:
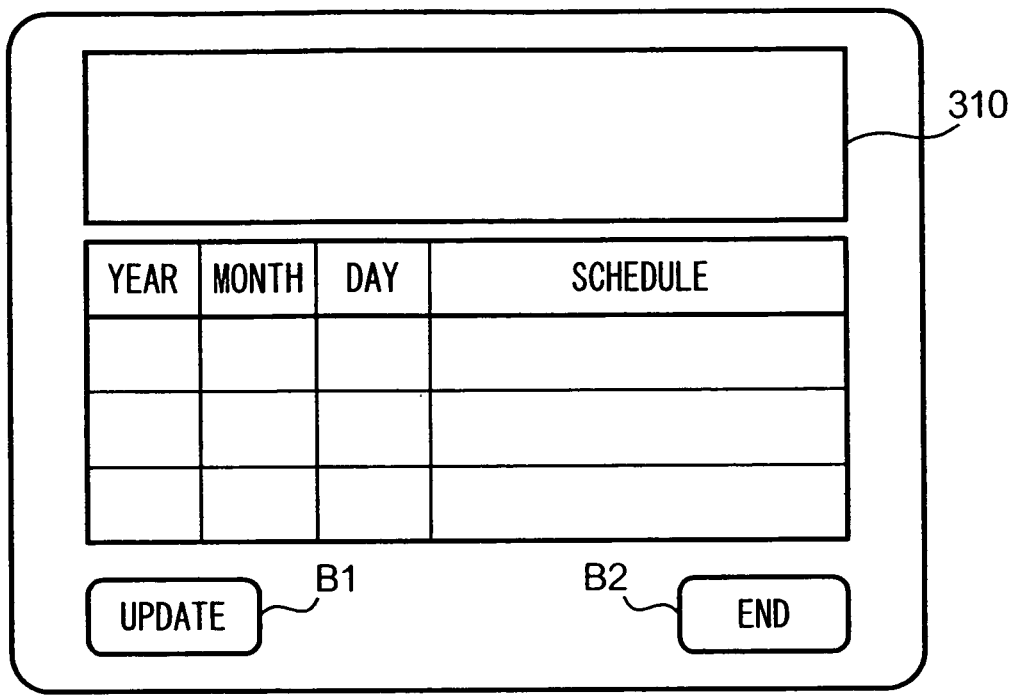
FIG. 3 is a drawing illustrating a schedule registration screen displayed on the display unit 520 of the terminal device 10.

In step SC5, the control unit 510 calls JAM to resume operation of the Java-APP that was suspended in step SC3. Specifically, the control unit 510 extracts event data corresponding to the program identifier of the Java-APP from the interrupt event table; and calls the resume method contained in the Java-APP by using the event flag constituting the interrupt event data as an argument for the method call, so as to resume the Java-APP. More specifically, the control unit 510 displays the schedule registration screen as shown in FIG. 3 on the display unit 20, when the resume method is called (step SB1 in FIG. 4). The control unit 510 then displays, in the region 310 of the schedule registration screen 310, a prescribed message corresponding to the event flag delivered as an argument for the method (step SB2 in FIG. 4); and terminates the operation in the resume method. For example, since the event flag "1" represents that suspension was caused by a call in the present example, a prescribed message "Call is terminated. Would you like to update your schedule?" is displayed in the region 310. Accordingly, after the operation in the resume method, the schedule registration screen shown in FIG. 9 is displayed on the display unit 520 of the terminal device 10.

After resuming operation of the Java-APP, the control unit 510 deletes the entry of the interrupt event data containing the program identifier of the Java-APP in the interrupt event table (SC6). Subsequently, the control unit 510 executes operations according to the flow chart shown in FIG. 2, in accordance with Java bytecodes constituting the Java-APP.

B-2: Example 2 When Email is Received

Figure 10:
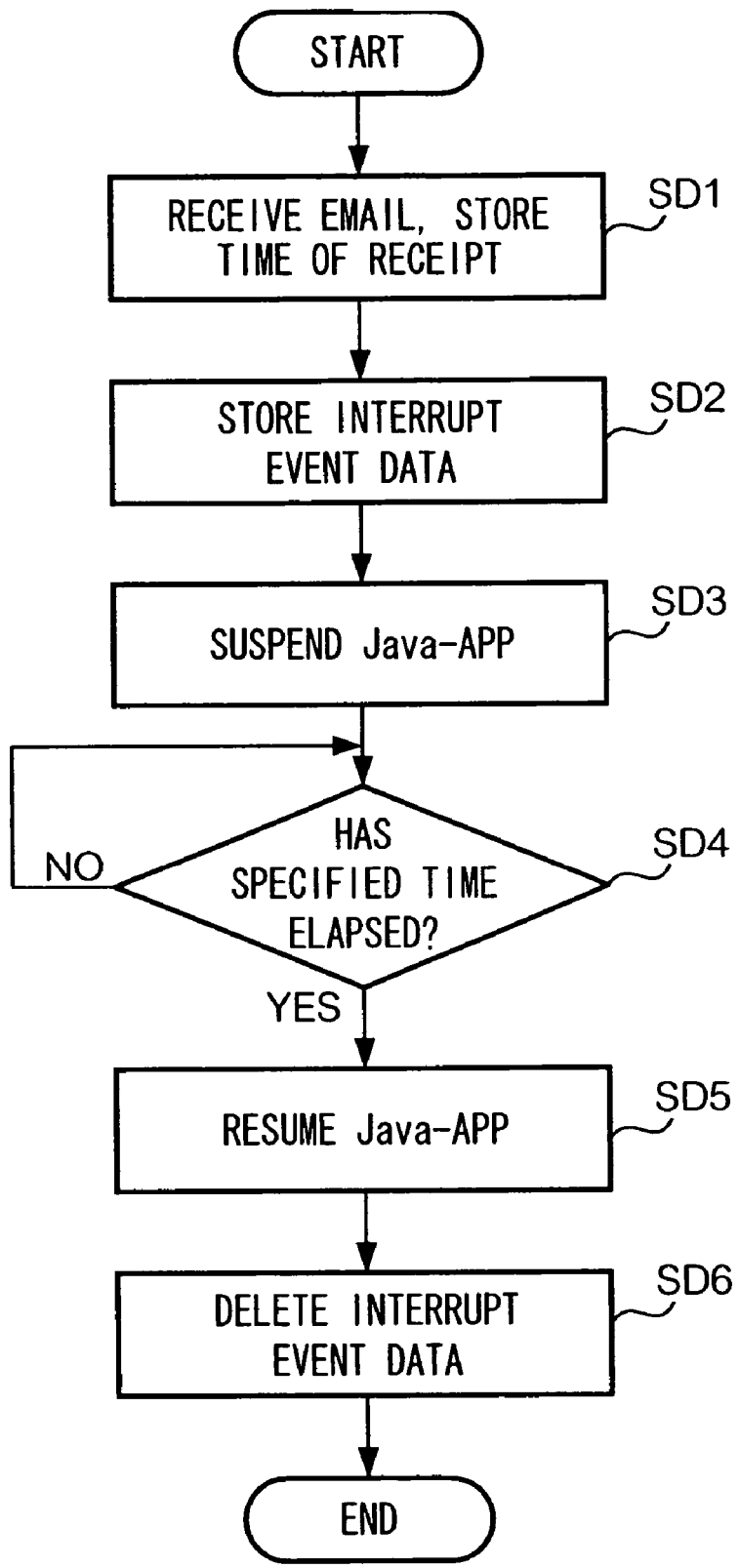
FIG. 10 is a flowchart illustrating flow of operations in the terminal device 10 in the case of receipt of email.

Next, operation of the control unit 510 will be described in the case of receiving email, with reference to the flowchart shown in FIG. 10. In step SD1, the control unit 510 receives email via the wireless communication unit 550; acquires the time of receipt of the email from the timer unit 540; and stores the time of receipt in the volatile storage unit 571. The control unit 510 stores, in the interrupt event table, an entry of the interrupt event data containing a pair of a program identifier of the Java-APP in operation and an event flag "2" representing that suspension was caused by receipt of email (step SD2). The control unit 510 calls JAM to suspend operation of the Java-APP (step SD3).

Subsequently, the control unit 510 notifies the user carrying the terminal device 10 of the receipt of email; prompts the user to launch mailer software, and determines whether a specified time has elapsed (step SD4). Specifically, the control unit 510 acquires the current time from the timer unit 540, and compare a specified time with the time difference between the current time and the time of receipt stored in the volatile memory unit 571. The control unit 510 repeats the determination step SD4, while the time difference is shorter than the specific time in step SD4. If the time difference is equal or longer than the specific time, the control unit 510 advances its operation to step SD5. In step SD5, the control unit 510 calls JAM to resume operation of the Java-APP that was suspended in step SD3 in the similar manner to the example 1. Specifically, the control unit 510 extracts event data corresponding to the program identifier of the JavaAPP from the interrupt event table; and calls the resume method contained in the JavaAPP in the similar manner to the example 1. However, in the present example, the event flag is set to "2" representing that suspension was caused by receipt of email. Accordingly, the control unit 510 displays, in the region 310 of the schedule registration screen 310, a prescribed message corresponding to the event flag delivered as an argument for the method (step SB2 in FIG. 4). For example, since the event flag "2" represents that suspension was caused by receipt of email in the present example, a prescribed message "You have email. Would you like to read it?" is displayed in the region 310. Thus, after the operation in the resume method, the schedule registration screen shown in FIG. 11 is displayed on the display unit 520 of the terminal device 10.

In the present example, operation of the Java-APP is resumed after a specified time is elapsed from the receipt of email. Otherwise, operation of the Java-APP can be resumed immediately after completing receipt of email, since the time required to complete receipt is in general negligible short from the start time of receipt of email.

Accordingly, in the latter case, the user has to endure inconvenience of terminating the Java-APP and launching mailer software so as to read the received email.

As described above, according to the present embodiment, the screen displayed in the terminal device after resuming the operation of the Java-APP may differ from the screen displayed while the Java-APP is operating without suspension. Different screens can be displayed in accordance with the event causing suspension of operating the Java-APP. Thus, the Java-APP improves user friendliness in the case that a scheduler function is available, such that the Java-APP prompts a user to confirm whether an update of a schedule data is required in the event of causing suspension, such as the receipt of a call request for a voice communication or email.

In the above described embodiment, different messages are displayed in the display unit 520 corresponding to an event causing suspension. However, audio output may be generated by the audio input/output unit depending on the message corresponding to the event.

C. Modifications

The present invention is not limited to the above described embodiment, and various modifications are applicable within the scope of the technical concept of the present invention. For example, following modifications may be applicable.

C-1: In the above described embodiment, operation of Java-APP is suspended when terminal device 10 receives, via the wireless communication unit 550, a call request or data designating a user carrying the terminal device 10, such as email. However, operation of Java-APP may also be suspended in response to other events. For example, the terminal device 10 is provided with a short range communication means, such as Bluetooth (Registered Trademark) interface or an infra-red communication interface; and may suspend operation of Java-APP, when the terminal device 10 transmits and/or receives data by using the short range communication means. Further, the terminal device 10 may suspend running Java-APP, when the running Java-APP calls another program, such as a mail program or browsing program. Otherwise, in response to an input operation of data intended for the other program, the running Java-APP can unintentionally receive the data, since the Java-APP is still running in terminal device 10.

C-2: In the above-described embodiment, the interrupt event table stores a single event flag causing suspension of operation of Java-APP; and the Java-APP changes the operation of terminal device 10 on the basis of the event flag after resuming operation of the Java-APP. However, the interrupt event table may also store one or more event flags corresponding to events occurring during the period between the time of suspending the operation and the time of resuming the operation; and the Java-APP may change the operation of terminal device 10 on the basis of the event flags after resuming operation of the Java-APP. Thus, for example, it is possible to notify a user of all events occurring between the time of suspending operation of the Java-APP and the time of resuming operation of the Java-APP. Specifically, when an operation of the Java-APP is resumed, the number of messages corresponding to interrupt event data stored in the interrupt event table in the region 310 of the schedule registration screen, is the same as the number of entries of interrupt event data stored in the interrupt event table.

C-3: In the above described embodiment, the Java-APP improves user friendliness in the case that a scheduler function is available. However, Java-APP according to the present invention may improve not only user friendliness but also design flexibility. For example, Java-APP according to the present invention may improve a user's enjoyment when using a game function.

For a first example, operation of the Java-APP having a game function is suspended when terminal device 10 receives a call request for a voice communication. Then, after resuming operation of the Java-APP, a prescribed message screen displaying "Call is terminated. Shall we continue?" may be displayed in accordance with the Java bytecodes constituting the Java-APP, so as to provide a user carrying the terminal device with a chance to end the game. A similar prescribed message may be displayed in a speech balloon attached with a cartoon character in the game.

For a second example, a server device stores keyword data used in playing the game, in advance. The Java-APP running in the terminal device 10 transmits a request for the keyword data to the server; and then operation of the Java-APP is suspended.

In response to the request from the Java-APP in the terminal deice 10, the server device transmits an email containing the keyword data to the terminal device 10 corresponding to the request. When terminal device 10 receives the email containing the keyword data, the terminal device 10 resumes operation of the Java-APP; and then displays a message such as "This email may contain a keyword to advance to the next stage. Would you like to read the email?".

C-4: In the above described embodiment, mobile phone is provided with a Java Runtime Environment conforming to J2ME. The present invention is most effective in this type of mobile phone, since suspension and resumption of operating the Java-APP occurs frequently by receipts of call requests and/or emails in this case. However, the terminal device adoptable in the present invention is not limited to mobile phones. The present invention is at least applicable for any computer device provided with a Java Runtime Environment; namely, applicable for a PHS (Registered Trademark, Personal Handyphone System) terminal, PDA or personal computer. Further, the Java Runtime Environment adoptable in the present invention is not limited to a Java Runtime Environment conforming to J2ME. A Java Runtime Environment conforming to J2SE (Java 2 platform Standard Edition) may be applicable for the present invention; and is a standard edition of a Java Runtime Environment dedicated to personal computer devices. A Java Runtime Environment conforming to J2EE (Java 2 platform Enterprise Edition) may also be applicable for the present invention; and is a standard edition of a Java Runtime Environment standard dedicated to server computer devices; that is, a Java Runtime Environment in which operation of Java-APP is managed in accordance with JAM.

Further, in the above described embodiment, Java-APP is operating in terminal device 10. However, the application program operated in the terminal device 10 is not limited to Java-APP. For example, an application program may be written in another programming language such as C++. In such a case, the terminal device 10 has to store software for managing operation of the application program written in another programming language, instead of the above described JAM for Java.

C-5: In the above described embodiment, software for constituting a Java Runtime Environment is preinstalled in (Please see above suggestion) the terminal device 10 for providing the terminal device 10 with functions of the present invention. However, such software may be installed in a general computer from a computer device readable storage medium, such that the general computer can have the same function of the terminal device 10.

What is claimed is:

1. A terminal device, comprising:
a processor configured to download and store an application program in response to receipt of a user command;
the processor further configured to execute an operating system and execute a runtime environment, the runtime environment controlled with the operating system to manage the application program;
the processor further configured to execute the application program by interpretation of the application program with the runtime environment;
the processor further configured to detect one of a predetermined set of events that cause operation of the application program to suspend;
the processor further configured to execute the operating system to generate event data indicative of a cause of the suspension of the application program;
the processor further configured to suspend operation of the application program in response to detection of the one of the predetermined set of events; and
means for storing a plurality of event data indications;
wherein the processor is further configured to resume operation of the application program suspended by the processor, and the event data indications each represent respective events between a start of suspension of operation of the application program and resumption of operation of the application program at an end of the suspension; and
the processor is further configured to execute the operating system to deliver at least one of the stored event data indications to the resumed application program, wherein operation of the resumed application program is configured to adjust in accordance with the at least one of the event data indications to be responsive to the cause of the suspension.

2. The terminal device of claim 1, further comprising means for communicating via a communication network, and wherein:
the processor is further configured to suspend operation of the application program when the means for communicating receives a message designating a user of the terminal device.

3. The terminal device of claim 1, further comprising display means for displaying information to a user, the display means operable to display a message related to the cause of the suspension, the resumed application program operable to generate the message in response to receipt of the delivered stored event data.

4. The terminal device of claim 1, wherein the processor is further configured to maintain as unchanged data input by a user and temporarily stored in the terminal device during operation of the application program.

5. The terminal device of claim 1, wherein the resumed application program is configured to generate a message to notify a user of the cause of the suspension based on the stored event data.

6. The terminal device of claim 1, wherein the predetermined set of events comprising receipt of an email or a voice call request.

7. The terminal device of claim 6, where in response to the event being receipt of an email message, the processor is further configured to resume operation of the suspended application program after a specified time has elapsed following display of the message.

8. The terminal device of claim 6, wherein the processor is further configured to generate different messages that originate from the resumed application program dependent on the cause of the suspension.

9. The terminal device of claim 1, wherein the data related to the application program that is input by the user remains in random access memory after operation of the application program is suspended.

10. The terminal device of claim 1, wherein the storage means comprises an interrupt table that identifies the event data and the application program interrupted thereby.

11. A program product useable with a computer device comprising:
a computer readable medium encoded with a computer program that is executable by a processor to cause:
download and storage in memory of an application program;
operation of an operating system and execution of a runtime environment controlled by the operating system;
interpretation and execution of the application program with the runtime environment to manage the application program via the operating system;
detection of one of a predetermined set of events that cause operation of the application program to suspend;
suspension of operation of the application program when an event is detected that is in the predetermined set of events;
generation of event data with the operating system, the event data indicative of a cause of suspension of the application program;
storage of a plurality of event data indications;
resumption of operation of the application program that was suspended, wherein the event data indications each represent respective events between a start of suspension of operation of the application program and an end of suspension when operation of the application program is resumed;
delivery of at least one of the event data indications to the resumed application program with the operating system; and
the resumed application executable with the runtime environment to adjust further operation of the resumed application program in accordance with the at least one of the received event data indications to be responsive to the cause of the suspension.

12. The program product of claim 11, further comprising the operating system maintaining as unchanged data input by a user and temporarily stored in the terminal device during operation of the application program.

13. The program product of claim 11, wherein the predetermined set of events comprise receipt of an email or a voice call request.

14. A terminal device comprising:
a memory;
instructions stored in the memory to call a runtime environment with an operating system included in the terminal device;
instructions stored in the memory to interpret and execute an application with the runtime environment under control of the operating system;
instructions stored in memory to detect receipt of a first predetermined event;
instructions stored in the memory to call the runtime environment to suspend operation of the application that is currently being executed in response to the first predetermined event;
instruction stored in the memory to initiate resumption of execution of the application in response to a second predetermined event;
instructions stored in the memory to extract the stored event data;
instructions stored in the memory to call the runtime environment to resume execution of the application;
instructions stored in the memory to provide the extracted stored event data to the resumed application, wherein the application is resumed in accordance with the extracted event data; and
instructions stored in the memory to generate a message originated from the resumed application that notifies a user of the first predetermined event.

15. The terminal device of claim 14, wherein instructions stored in the memory to generate a message comprises instructions stored in memory to generate a query to a user that is related to the first predetermined event.

16. The terminal device of claim 14, wherein the application is a first application, and instructions stored in the memory to generate a message comprises instructions stored in memory to generate a query to a user to launch a second application to attend to the first predetermined event.

17. The terminal device as in claims 15 or 16, wherein the message comprises an audio message.

18. The terminal device as in claims 15 or 16, wherein the message comprises a text message.

19. The terminal device of claim 14, wherein the first predetermined event comprises receipt by the terminal device of an email or a call request.

20. The terminal device of claim 14, wherein the first predetermined event comprises receipt or transmission by the terminal device of data via a short range transmission comprising Bluetooth transmission or infrared transmission.

21. The terminal device of claim 14, wherein the application is a first application, and the first predetermined event comprises execution of a second application by the first application, and the terminal device further comprises instructions stored in the memory to call the runtime environment to suspend operation of the first application when execution of the second application occurs.

22. The terminal device of claim 14, further comprising instructions stored in the memory for the operating system to store event data for events that occur while the application is suspended, and instructions stored in the memory for the operating system to provide notification of the events that occur while the application is suspended, when execution of the application is resumed.

23. The terminal device of claim 14, wherein the second predetermined event comprises a user command.

24. The terminal device of claim 14, wherein the second predetermined event comprises expiration of a determined time period.

25. The terminal device of claim 14, wherein the second predetermined event comprises completion of the first predetermined event.

26. The terminal device of claim 14, wherein instructions stored in memory to suspend the application comprises instructions stored in the memory to, during the suspension, maintain application related data in volatile memory that was input by a user prior to the suspension.

27. The terminal device of claim 14, wherein instructions stored in memory to suspend the application comprises instructions stored in memory to maintain the suspended application in volatile memory during the suspension.

28. The terminal device of claim 14, wherein instructions stored in memory to store event data comprises instructions stored in memory for the operating system to set an event flag indicative of the first predetermined event.

29. The terminal device of claim 14, wherein instructions stored in memory to store event data comprises instructions stored in memory for the operating system to store an indicator of the first predetermined event and an identifier of the suspended application in a table.

30. The terminal device of claim 14, further comprising instructions stored in memory to store the application in volatile memory when the application is launched, and instructions stored in memory to suspend the application comprises instructions stored in memory to maintain the application in the volatile memory until execution is resumed.

31. The terminal device of claim 14, further comprising instructions stored in memory to delete the stored event data when execution of the application is resumed.

32. The terminal device of claim 14, wherein instructions stored in the memory to store event data indicating the cause of suspension of the application further comprise instructions stored in the memory to maintain as unchanged data input by a user and temporarily stored in the memory during operation of the application.

33. A terminal device comprising:
   a memory;
      instructions stored in the memory to interpret and execute an application with a runtime environment under control of an operating system;
   instructions stored in the memory to detect receipt of a first predetermined event;
   instructions stored in the memory to call the runtime environment to suspend operation of the application that is currently being executed;
   instructions stored in the memory for the operating system to store event data related to suspension of the application that comprises instructions stored in the memory to set an event flag indicative of the first predetermined event;
   instructions stored in the memory to initiate resumption of execution of the application in response to a second predetermined event;
   instructions stored in the memory for the operating system to extract the stored event data;
   instructions stored in the memory to call the runtime environment to resume execution of the application, in accordance with the extracted event data; and instructions stored in the memory to generate with the resumed application any one of a plurality of different screens for display to a user that correspond to the extracted event data to notify the user of the first predetermined event.

34. A terminal device comprising:
   a memory;
   instructions stored in the memory to control execution of a runtime environment with an operating system included in the terminal device;
   instructions stored in the memory to detect receipt of a first predetermined event;
   instructions stored in the memory to use the runtime environment to suspend operation of an application that is currently being executed;
   instructions stored in the memory for the operating system to store in a table, a predetermined indicator of the first predetermined event in association with an identifier of the suspended application;
   instructions stored in the memory for the operating system to call the runtime environment to initiate resumption of execution of the application in response to a second predetermined event;
   instructions stored in the memory to extract the stored event data and deliver the predetermined indicator to the resumed application;
   instructions stored in the memory to use the runtime environment to resume execution of the application, in accordance with an interpretation by the resumed application of the predetermined indicator; and
   instructions stored in the memory to use the runtime environment to generate a message originated from the resumed application that notifies a user of then first predetermined event base on the interpretation by the resumed application of the predetermined indicator.

35. A terminal device comprising:
   a memory;
   instructions stored in the memory to download and store an application in response to a user command;
   instructions stored in the memory to control a runtime environment with an operating system included in the terminal device;
   instructions stored in the memory to interpret and execute the application with the runtime environment under control of the operating system;
   instructions stored in the memory to detect receipt of a first predetermined event;
   instructions stored in the memory to control the runtime environment with the operating system to suspend operation of the application that is currently being executed in response to the first predetermined event;
   instructions stored in the memory to store event data related to suspension of the application, the event data comprising an identifier of the suspended application;
   instructions stored in the memory to initiate resumption of execution of the application with the operating system in response to a second predetermined event;
   instructions stored in the memory for the operating system to extract the stored event data;
   instructions stored in the memory to control the runtime environment with the operating system to resume execution of the application, the resumption of execution of the application based on the extracted event data; and
   instructions stored in the memory to generate a message originated from the resumed application in response to the extracted event data, wherein the message is configured to notify a user of the first predetermined event.

\* \* \* \* \*

UNITED STATES PATENT AND TRADEMARK OFFICE
CERTIFICATE OF CORRECTION

| | |
|---|---|
| PATENT NO. | : 7,647,075 B2 |
| APPLICATION NO. | : 10/810499 |
| DATED | : January 12, 2010 |
| INVENTOR(S) | : Tsuda et al. |

It is certified that error appears in the above-identified patent and that said Letters Patent is hereby corrected as shown below:

In the Claims

In Column 14, line 21, delete "then" and insert --the--.

In Column 14, line 22, delete "base" and insert --based--.

Signed and Sealed this

Twentieth Day of April, 2010

David J. Kappos
*Director of the United States Patent and Trademark Office*